(12) United States Patent
Segal

(10) Patent No.: US 6,568,155 B2
(45) Date of Patent: May 27, 2003

(54) FRUIT INJECTOR

(75) Inventor: Eric Segal, 38 Hollywood Avenue, North York, Ontario (CA), M2N 6S5

(73) Assignee: Eric Segal, North York (CA)

( * ) Notice: Subject to any disclaimer, the term of this patent is extended or adjusted under 35 U.S.C. 154(b) by 0 days.

(21) Appl. No.: 10/103,117

(22) Filed: Mar. 22, 2002

(65) Prior Publication Data

US 2002/0184859 A1 Dec. 12, 2002

Related U.S. Application Data

(63) Continuation-in-part of application No. 09/791,609, filed on Feb. 26, 2001, now Pat. No. 6,389,783.
(60) Provisional application No. 60/234,945, filed on Sep. 26, 2000.

(51) Int. Cl.[7] .............................................. B65B 63/02
(52) U.S. Cl. .............................. 53/436; 53/115; 53/527; 53/528

(58) Field of Search ........................... 53/115, 436, 527, 53/528, 529; 99/485, 506, 508; 100/132, 133, 37, 131, 125

(56) References Cited

U.S. PATENT DOCUMENTS

| | | | | | |
|---|---|---|---|---|---|
| 194,457 A | * | 8/1877 | Newsam | ...................... | 100/130 |
| 1,759,357 A | * | 5/1930 | Lacey | ........................... | 53/258 |
| 1,996,970 A | * | 4/1935 | Morris | ........................ | 100/133 |
| 2,589,724 A | * | 3/1952 | Miller | ........................ | 100/125 |
| 3,030,748 A | * | 4/1962 | Moses | .......................... | 53/115 |
| 3,227,069 A | * | 1/1966 | Mouton | ...................... | 100/133 |

* cited by examiner

Primary Examiner—Scott A. Smith
Assistant Examiner—Chukwurah Nathaniel
(74) Attorney, Agent, or Firm—Paul S. Sharpe; Ogilvy Renault

(57) ABSTRACT

A fruit injector and method for squeezing a fruit segment into a container, particularly, a beer bottle. A channel shaped body includes a plunger and a compression member pivotally connected for movement to the body for compressing a fruit segment.

4 Claims, 2 Drawing Sheets

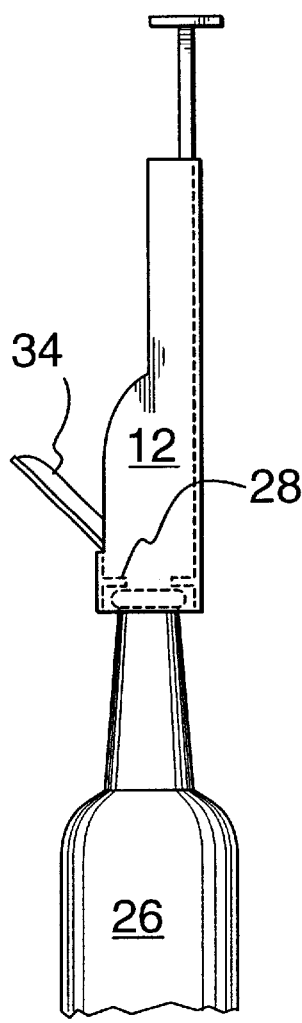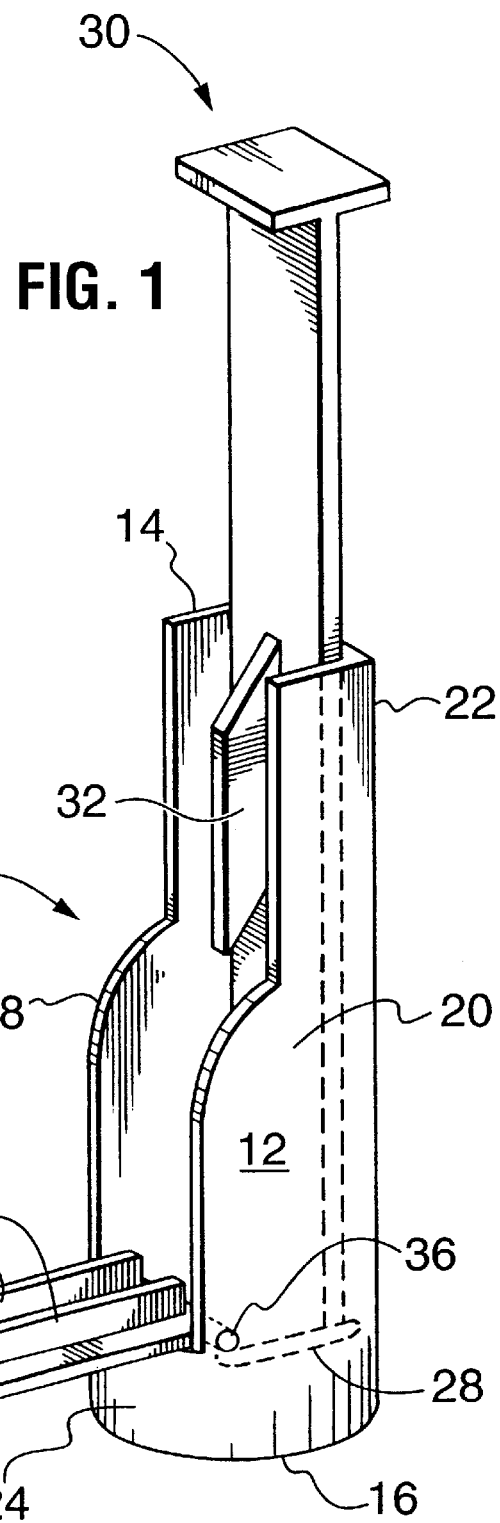

FRUIT INJECTOR

This is a continuation-in-part application of U.S. Ser. No. 09/791,609, filed Feb. 26, 2001, now U.S. Pat. No. 6,389,783, and claims benefit of provisional application Ser. No. 60/234,945 filed Sep. 26, 2000.

FIELD OF THE INVENTION

The present invention relates to a fruit injector and more particularly, the present invention relates to a device and method suitable for squeezing citrus fruit juice into a container and plunging the rind and other material into the container.

BACKGROUND OF THE INVENTION

As is known in the beverage industry, some beverages are enjoyed by consumers where the beverage may include a section of citrus fruit. Typical is the situation where a slice of lime or lemon is inserted into a beer bottle. As it is presently conducted, the user simply squeezes the section of citrus fruit over the top of the container, in this case a beer bottle, and subsequently inserts the rind into the bottle. This is a rather messy affair and results in the juice being squeezed out over the hand of the user and elsewhere as opposed to being within the bottle itself.

It would be desirable if there were a device suitable for squeezing and subsequently injecting citrus material into a bottle. The present invention addresses this need.

SUMMARY OF THE INVENTION

One object of the present invention is to provide an apparatus suitable for squeezing and subsequently injecting a fruit segment into a container.

A further object of one embodiment of the present invention is to provide a device for injecting a fruit into a container, comprising: a hollow body having an inlet and an outlet, the outlet adapted for disposition over a container top; a plunger slidably mounted within the body for reciprocal movement within the body; and a compression member moveably mounted to the body to compress the fruit, whereby a compressed fruit may be injected into the container through the outlet of the body.

The body may be composed of suitable material which permits numerous uses and is not susceptible to damage during washing. To this end the body may be composed of plastic materials such as polyethylene, polystyrene, high impact polystyrene, etc. In order to compress the fruit within the body, a compression member is provided as indicated above. This member may be mounted to the body either by suitable pivot or flex point or may be slidably moveable relative to the body by a raceway and pin arrangement with the concept being that the compression member is moveable from a load position where the piece of fruit is inserted into the body to a compression position where the material is squeezed in order to discharge the juice into the bottle. In terms of the plunger and the moveable member, similar material as that indicated for the body may be employed to construct these elements and the plunger may include stops or other suitable projections thereon for urging a slice into the bottle neck or container top, etc.

As will be evident, the concept with the instant device is to provide the compression of a section of fruit through a hollow body having a reduced cross-sectional area. The benefit of this type of compression is clear—the juice of the fruit section is eventually discharged to the container over which the hollow body is placed.

As a further feature, the dejuiced section of fruit may be inserted into a container in use. This is an optionally step that is ascribed to the instant invention.

In yet another object of the present invention, there is provided a method for injecting a fruit into a container, comprising the steps of:

providing a hollow body having an inlet and an outlet, the body having a reduced cross-sectional area between the inlet and the outlet and a plunger slidable within the body;

positioning the outlet of the hollow body over the top of the container;

charging the hollow body with a section of fruit;

urging the plunger through the body; and compressing the section of fruit during plunging through the reduced cross-sectional area to insert the section of fruit and juice into the container.

A still further object of one embodiment of the present invention is to provide a method of extracting juice from a section of fruit, comprising the steps of:

providing a hollow body having an inlet and an outlet, the body having a reduced cross-sectional area between the inlet and the outlet and a plunger slidable within the body;

positioning the outlet of the hollow body over the top of the container;

charging the hollow body with a section of fruit;

compressing the section of fruit within the reduced cross-sectional area of the hollow body; and draining juice into an open top of a container.

In use, the user moves the compression member into a loading position where the segment of fruit is inserted into the body. The compression members then urge against the fruit and the compression action of the compression member together with the fruit being urged against the plunger results in the juice being discharged from the cells of the fruit and into the container top. The plunger may then be activated to plunge or inject the rind into the container through the outlet in the body.

The present invention allows injection of the segment of fruit into a container in the absence of any mess, while maximizing the amount of juice extraction.

Having thus described the invention, reference will now be made to the accompanying drawings illustrating preferred embodiments.

BRIEF DESCRIPTION OF THE DRAWINGS

FIG. 1 is a perspective view of the article according to one embodiment;

FIG. 2 is a side view of the article as positioned about a container; and

Similar numerals in the figures denote similar elements.

DETAILED DESCRIPTION OF THE PREFERRED EMBODIMENTS

Figure 3:
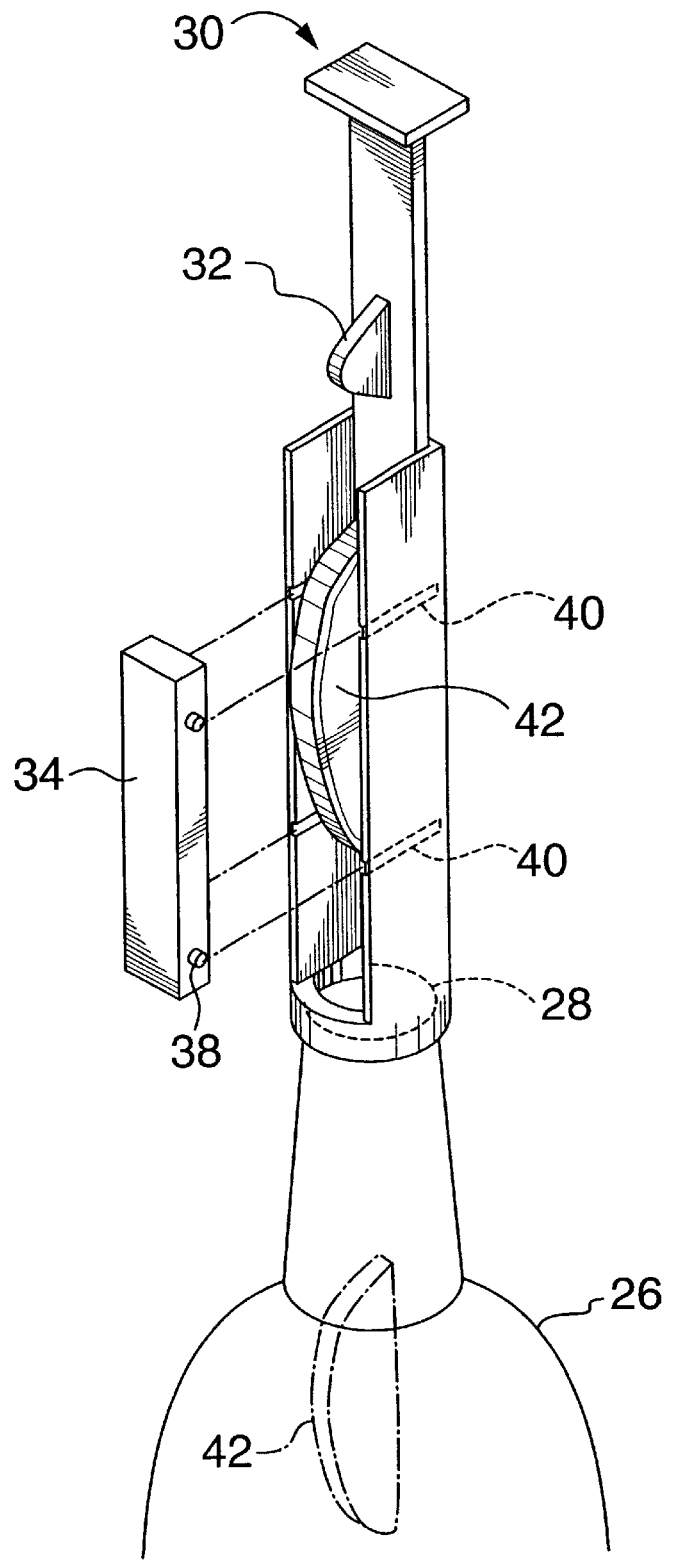
FIG. 3 is a an exploded view of an alternate embodiment of the present invention.

Referring now to the Figures, the overall device is referenced by numeral 10 with the article including central body 12 having an inlet end 14 and an outlet end 16 in opposition. The body 12, according to the embodiment shown in FIG. 1, substantially corresponds to a channel shaped structure with two similarly configured side walls 18 and 20, and a base wall 22, adjacent the hollow body 12, particularly end outlet 16 there is included a ring 24, which ring 24 is configured to receive the top of a container 26, shown in the example as a typical beer bottle. Abutments, stops or projections 28 positioned in ring member 24 are designed as a stop means for stopping the top of the container from being positioned too far within body 12.

Mounted for reciprocal sliding motion within body 12 is a plunger 30 having a shaped configured for slidable movement within body 12. The plunger 30 also includes a projection or stop 32 which is adapted to urge a section of citrus fruit downwardly through the body 12 and subsequently into container 26. The section of fruit is not shown in FIGS. 1 and 2. Adjacent outlet 16 and ring 24 there is provided a compression member 34 which is moveably mounted and more particularly, in example 1, pivotally connected at 36 on body 12 for movement between a loading position wherein a section of fruit can be positioned within the inlet and adjacent stop 32 on plunger 30 and a use position, partially shown in FIG. 2 where the compression member 34 is more positively inclined relative to body 12. The compression member includes at least one projection which extends outwardly from the surface for positioning against a slice of citrus, the projection being denoted by numeral 37.

Turning to FIG. 2, shown is a variation on the embodiments of FIGS. 1 and 2, where the compression member 34 is slidably moveable on body 12. In this example, compression member 34 includes pins 38 which are received within raceways 40 within the walls of body 12. In this manner, a section of fruit 42 is positioned between plunger 30 and compression member 34 and compression member 34 is simply urged against the plunger body by the user to squeeze the juice from citrus slice 42 into container 26 and the plunger 30 subsequently activated to insert the citrus rind into the body of the container as shown in dash lines of FIG. 3.

It will be appreciated that projections 36 and 32 will be configured so that they do not interfere with one another.

In another embodiment, the compression member 34 may be connected to body 12 by a living hinge to facilitate pivotal movement.

In each of the embodiments discussed, it will be evident that the cross-sectional area of the device is reduced in order for compression and thus juice discharge to be effected. The reduced cross-sectional area may be by compression member 34 as mechanical compression or by plunger 30 for plunger compression.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. A method of extracting juice from a section of fruit, comprising the steps of:

providing a hollow body having an inlet and an outlet, said body having a reduced cross-sectional area between and relative to said inlet and said outlet and a plunger slidable within said body, said plunger including at least one projection;

positioning said outlet of said hollow body over a top of said container;

charging said hollow body with a section of fruit; and compressing said fruit with a compression member against said plunger, and compressing said fruit with said plunger to drain juice into an open top of said container.

2. The method as set forth in claim 1, wherein compression includes mechanically compressing said section of fruit within said body.

3. The method as set forth in claim 2, wherein compression includes compression by a mechanical lever and compression by said plunger.

4. The method as set forth in claim 1, further including the step of injecting a compressed fruit segment into said container.

* * * * *